US012681460B2

(12) United States Patent
Tsai et al.

(10) Patent No.: US 12,681,460 B2
(45) Date of Patent: Jul. 14, 2026

(54) CONTROLLER APPLIED TO SERVOMOTOR AND ASSOCIATED CONTROL METHOD

(71) Applicant: Elite Semiconductor Microelectronics Technology Inc., Hsinchu (TW)

(72) Inventors: Ming-Fu Tsai, Hsinchu (TW);
Sheng-Hung Hsu, Hsinchu (TW);
Ta-Wei Liu, Hsinchu (TW);
Chien-Chih Lai, Taichung City (TW)

(73) Assignee: Elite Semiconductor Microelectronics Technology Inc., Hsinchu (TW)

( * ) Notice: Subject to any disclaimer, the term of this patent is extended or adjusted under 35 U.S.C. 154(b) by 296 days.

(21) Appl. No.: 18/671,972

(22) Filed: May 22, 2024

(65) Prior Publication Data

US 2025/0362661 A1 Nov. 27, 2025

(51) Int. Cl.
*G05B 19/4155* (2006.01)

(52) U.S. Cl.
CPC .................... *G05B 19/4155* (2013.01); *G05B 2219/34013* (2013.01)

(58) Field of Classification Search
None
See application file for complete search history.

(56) References Cited

U.S. PATENT DOCUMENTS 4,890,284 A * 12/1989 Murphy .............. G06F 11/1487
714/11
2020/0144953 A1* 5/2020 Wu .................... G05B 23/0264

FOREIGN PATENT DOCUMENTS

CN 1540496 A 10/2004
TW 371818 10/1999
WO 2023/171574 A1 9/2023

* cited by examiner

*Primary Examiner* — Sean Shechtman
(74) *Attorney, Agent, or Firm* — Winston Hsu

(57) ABSTRACT

A controller applied to a servomotor includes a flash memory, a microcontroller, and a processing circuit. The flash memory is arranged to store a first program code for controlling the servomotor. The microcontroller is arranged to determine whether an alarm of the servomotor occurs, wherein in response to the alarm of the servomotor occurring, the microcontroller is arranged to store an error log corresponding to the alarm in the flash memory. In addition, a second program code is programmed into the processing circuit in advance, wherein the second program code is a copied version of the first program code; and in response to the alarm of the servomotor occurring, the processing circuit is arranged to execute the second program code.

20 Claims, 6 Drawing Sheets

CONTROLLER APPLIED TO SERVOMOTOR AND ASSOCIATED CONTROL METHOD

BACKGROUND OF THE INVENTION

1. Field of the Invention

The present invention is related to a servomotor, and more particularly, to a servomotor controller and an associated control method that can ensure an error log corresponding to an alarm of the servomotor to be stored in a flash memory and simultaneously maintain operations of the servomotor.

2. Description of the Prior Art

For a device including a servomotor (e.g., a low cost drone), under a condition that an alarm of the servomotor occurs, the servomotor is required to keep operating to avoid certain fatal errors of the device (e.g., a crash event of the drone). For a controller applied to the servomotor, a flash memory and a microcontroller may be mounted on a printed circuit board (PCB) that is disposed on the servomotor, wherein the flash memory has a single access channel (e.g., only a single access operation can be performed upon the flash memory at the same time), and both a program code for controlling the servomotor and an error log related to the alarm of the servomotor may be stored in the flash memory. When the microcontroller writes the error log into the flash memory, the microcontroller is unable to read the program code from the flash memory for controlling the servomotor, which may cause the fatal errors of the device.

For a conventional servomotor controller, an electrically-erasable programmable read-only memory (EEPROM) may be coupled to the servomotor controller through a bus for storing the error log, however, the EEPROM will increase the overall manufacturing cost and increase the size of the PCB. As a result, a novel controller applied to the servomotor that can ensure the error log to be stored in the flash memory and simultaneously maintain operations of the servomotor, is urgently needed.

SUMMARY OF THE INVENTION

It is therefore one of the objectives of the present invention to provide a controller applied to a servomotor and an associated control method that can ensure an error log corresponding to an alarm of the servomotor to be stored in a flash memory and simultaneously maintain operations of the servomotor, to address the above-mentioned issues.

According to an embodiment of the present invention, a controller applied to a servomotor is provided. The controller comprises a flash memory, a microcontroller, and a processing circuit. The flash memory is arranged to store a first program code for controlling the servomotor. The microcontroller is arranged to determine whether an alarm of the servomotor occurs, wherein in response to the alarm of the servomotor occurring, the microcontroller is arranged to store an error log corresponding to the alarm in the flash memory. In addition, a second program code is programmed into the processing circuit in advance, wherein the second program code is a copied version of the first program code; and in response to the alarm of the servomotor occurring, the processing circuit is arranged to execute the second program code.

According to an embodiment of the present invention, a control method for a servomotor is provided. The control method comprises: determining, by a microcontroller, whether an alarm of the servomotor occurs; in response to the alarm of the servomotor occurring, storing, by the microcontroller, an error log corresponding to the alarm in a flash memory, wherein the flash memory is further arranged to store a first program code for controlling the servomotor; and in response to the alarm of the servomotor occurring, executing, by a processing circuit, a second program code, wherein the second program code is programmed into the processing circuit in advance, and the second program code is a copied version of the first program code.

One of the benefits of the present invention is that, by the controller applied to a servomotor and the associated control method proposed by the present invention, in response to an alarm of the servomotor occurring, an error log corresponding to the alarm can be stored in a flash memory and operations of the servomotor can be maintained at the same time, which can avoid certain fatal errors of a device to which the servomotor is applied. In addition, compared with a case where an electrically-erasable programmable read-only memory (EEPROM) is coupled to the servomotor controller through a bus for storing the error log, the controller of the present invention can effectively decrease the overall manufacturing cost and decrease the size of the PCB by utilizing the processing circuit.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
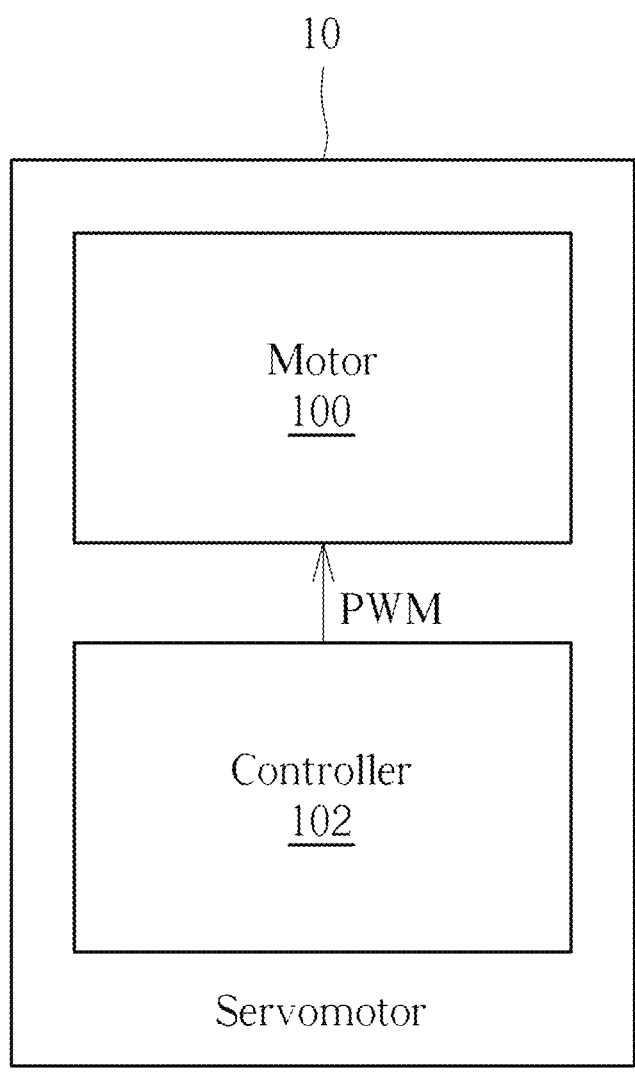
FIG. 1 is a diagram illustrating a servomotor according to an embodiment of the present invention.

FIG. 1 is a diagram illustrating a servomotor 10 according to an embodiment of the present invention. As shown in FIG. 1, the servomotor 10 may include a motor 100 and a controller 102, wherein components of the controller 102 may be mounted on a printed circuit board (PCB) that is disposed on the servomotor 10, but the present invention is not limited thereto. Examples of the motor 100 may include, but are not limited to: a brushless direct current (DC) motor and a brushed DC motor. Under a condition that the motor 100 is the brushless DC motor, the servomotor 10 may further include a hall sensor, and the hall sensor is arranged to generate a phase sequence signal for performing a commutation upon a stator of the motor 100. When an alarm AL of the servomotor 10 occurs, the controller 102 may be arranged to perform a corresponding processing according to a type of the alarm AL, and record an error log EL corresponding to the alarm AL. Examples of the type of the alarm AL may include, but are not limited to: a blocking alarm, an over-current alarm, an over-temperature alarm, a low-voltage alarm, and an over-voltage alarm. The controller 102 may control power components related to the motor 100 (e.g., a switching including multiple switching elements, wherein each of the multiple switching elements may be implemented by a transistor) by limiting/adjusting a duty cycle of a pulse width modulation (PWM) signal output to the motor 100 (labeled as "PWM" in FIG. 1), to further control a direction of the motor 100 (e.g., a rotation direction of a rotor of the motor 100; i.e., a phase sequence control is performed upon the motor 100).

Figure 2:
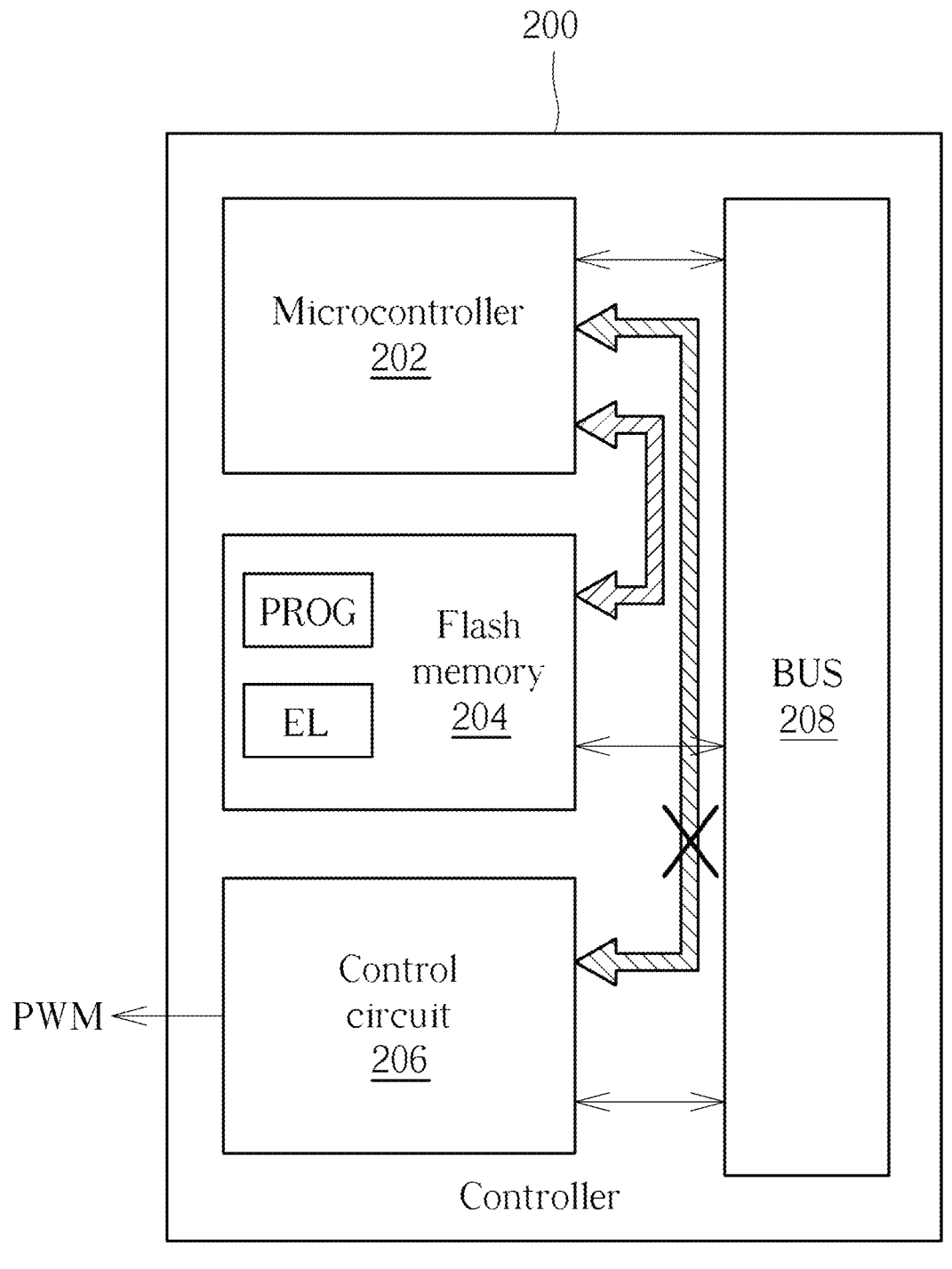
FIG. 2 is a diagram illustrating a controller applied to a servomotor.

FIG. 2 is a diagram illustrating a controller 200 applied to a servomotor (e.g., the servomotor 10 shown in FIG. 1). As shown in FIG. 2, the controller 200 may include a microcontroller (e.g., a micro control unit (MCU)) 202, a flash memory 204, and a control circuit 206, wherein the control circuit 206 may be a circuit implemented by an application specific integrated circuit (ASIC), and the above components of the controller 200 may be coupled to each other through a bus 208. The flash memory 204 may be arranged to store a program code PROG, wherein the program code PROG may include a motor algorithm. When the alarm AL of the servomotor 10 occurs, the microcontroller 202 may load (e.g., read) the program code PROG from the flash memory 204, so that the microcontroller 202 may execute the motor algorithm to control the control circuit 206 to perform corresponding operations regarding different type of the alarm AL, in order to make the servomotor 10 operate normally when the alarm AL occurs. For example, the control circuit 206 may be arranged to generate a PWM signal (labeled as "PWM" in FIG. 2) to control switching of the multiple switching elements for changing a rotor angle of the motor 100.

In addition, the microcontroller 202 may be further arranged to store (e.g., write) the error log EL corresponding to the alarm AL into the flash memory 204, for a user to confirm the type of the alarm AL. As mentioned above, the flash memory 204 has a single access channel (e.g., only a single access (e.g., read/write) operation can be performed upon the flash memory 204 at the same time). As a result, when the microcontroller 202 writes the error log EL into the flash memory 204, the microcontroller 202 is unable to load (e.g., read) the program code PROG from the flash memory 204, which may cause the servomotor 10 to operate abnormally. For example, when the microcontroller 202 writes the error log EL into the flash memory 204, the servomotor 10 will stop commutation, thereby causing temporary stalling of the servomotor 10.

Figure 3:
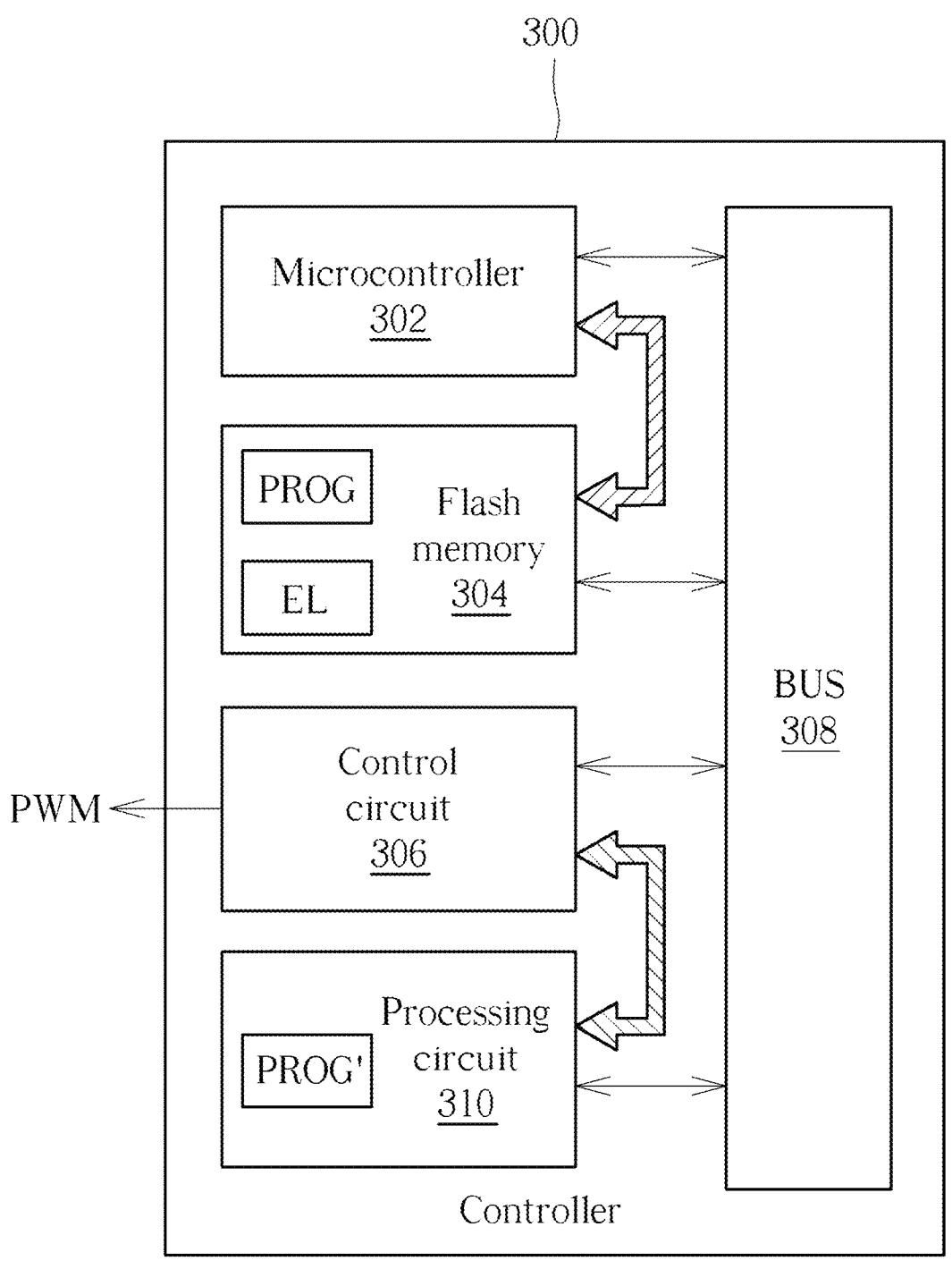
FIG. 3 is a diagram illustrating a controller applied to a servomotor according to an embodiment of the present invention.

In order to address this issue, the present invention proposes a controller that can ensure the error log EL to be stored in the flash memory and simultaneously maintain operations of the servomotor 10. FIG. 3 is a diagram illustrating a controller 300 applied to a servomotor (e.g., the servomotor 10 shown in FIG. 1) according to an embodiment of the present invention, wherein the controller 102 shown in FIG. 1 may be implemented by the controller 300. As shown in FIG. 3, the controller 300 may include a microcontroller 302, a flash memory 304, a control circuit 306, and a processing circuit 310, wherein each of the control circuit 306 and the processing circuit 310 may be a circuit implemented by an ASIC, and the above components of the controller 300 may be coupled to each other through a bus 308.

In this embodiment, the processing circuit 310 may off-load the control operations regarding the servomotor 10 from the microcontroller 302. Specifically, a program code PROG' may be programmed into the processing circuit 310 in advance, and the program code PROG' may be a copied version of the program code PROG stored in the flash memory 304. The microcontroller 302 may be arranged to determine whether the alarm AL of the servomotor 10 occurs. In response to the alarm AL of the servomotor 10 not occurring, there is no need to store the error log EL into the flash memory 304, and the microcontroller 302 may be arranged to read and execute the program code PROG from the flash memory 304, so that the microcontroller 302 executes the motor algorithm to control operations of the servomotor 10 (e.g., the moving of the motor 100 of the servomotor 10) through a PWM signal generated by the control circuit 306 (labeled as "PWM" in FIG. 3).

In response to the alarm AL of the servomotor 10 occurring, the microcontroller 302 may be arranged to store the error log EL corresponding to the alarm AL in the flash memory 304, and the program code PROG is prevented from being read from the flash memory 304 by the microcontroller 302. In addition, the processing circuit 310 may be arranged to execute the program code PROG', so that the processing circuit 310 executes the motor algorithm to control the control circuit 306 to perform corresponding operations regarding different types of the alarm AL, in order to make the servomotor 10 operate normally when the alarm AL occurs. By offloading the control operations regarding the servomotor 10 from the microcontroller 302 to the processing circuit 310 when the alarm AL of the servomotor 10 occurs, the controller 300 proposed by the present invention can ensure the error log EL to be stored in the flash memory 304 by the microcontroller 302 and simultaneously maintain operations of the servomotor 10 by the processing circuit 310, which can avoid certain fatal errors of a device to which the servomotor 10 is applied.

Figure 4:
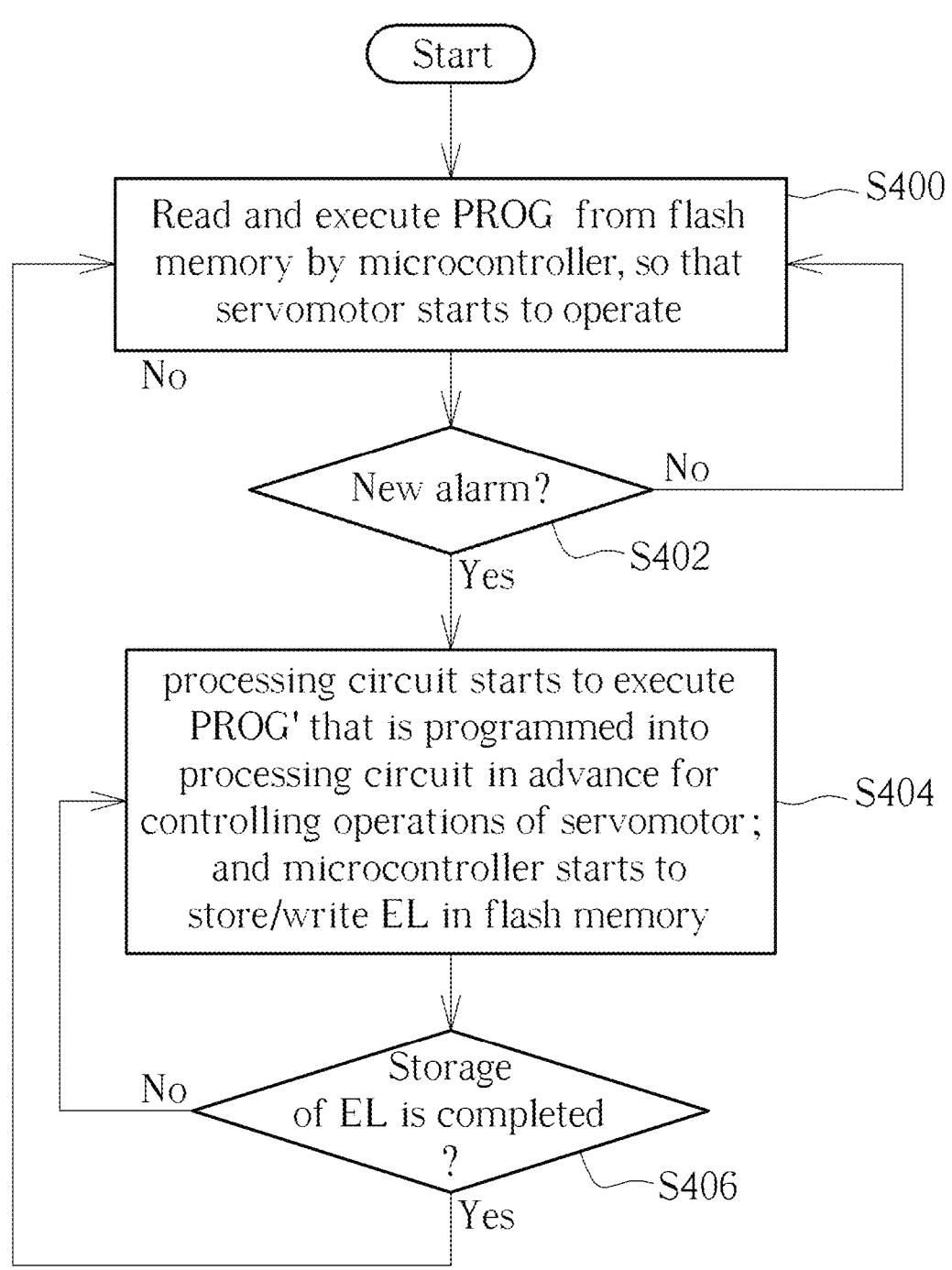
FIG. 4 is a diagram illustrating a working flow of associated circuits within the controller shown in FIG. 3 when an alarm of a servomotor occurs according to an embodiment of the present invention.

Regarding implementation details of the microcontroller 302 and the processing circuit 310, please refer to FIG. 4. FIG. 4 is a diagram illustrating a working flow of associated circuits within the controller 300 shown in FIG. 3 (e.g., the microcontroller 302 and the processing circuit 310) when the alarm AL of the servomotor 10 occurs according to an embodiment of the present invention. Provided that the result is substantially the same, the steps are not required to be executed in the exact order shown in FIG. 4.

In Step S400, the program code PROG is read and executed from the flash memory 304 by the microcontroller 302, so that the servomotor 10 starts to operate.

In Step S402, under a condition that the alarm AL of the servomotor 10 occurs, the microcontroller 302 may be further arranged to determine whether the alarm AL is a previous alarm in the flash memory 304. In response to the alarm AL being the previous alarm in the flash memory 304, since the error log corresponding to the previous alarm has already been stored/recorded in the flash memory 304, there is no need to store the error log EL corresponding to a current alarm (i.e., the alarm AL) in the flash memory 304 by the microcontroller 302. As a result, the microcontroller 302 may keep reading and executing the program code PROG from the flash memory 304 for controlling operations of the servomotor 10 (i.e., Step S400 is returned). In response to the alarm AL not being the previous alarm in the flash memory 304, control authority for the servomotor 10 may be transferred from the microcontroller 302 to the processing circuit 310, and Step S404 is entered.

In Step S404, the microcontroller 302 may notify the processing circuit 310 to start to execute the program code PROG' that is programmed into the processing circuit 310 in advance for controlling operations of the servomotor 10. In addition, the microcontroller 302 may start to store/write the error log EL in the flash memory 304.

In Step S406, the microcontroller 302 may be further arranged to determine whether storage of the error log EL is completed. If Yes, the control authority for the servomotor 10 may be transferred back to the microcontroller 302 from the processing circuit 310, and Step S400 is returned. For example, the processing circuit 310 may stop executing the program code PROG', and the microcontroller 302 may start to read and execute the program code PROG from the flash memory 304. If No, Step S404 is returned.

Since a person skilled in the pertinent art can readily understand details of the steps shown in FIG. 4 after reading the above paragraphs, further description is omitted here for brevity.

Figure 5:
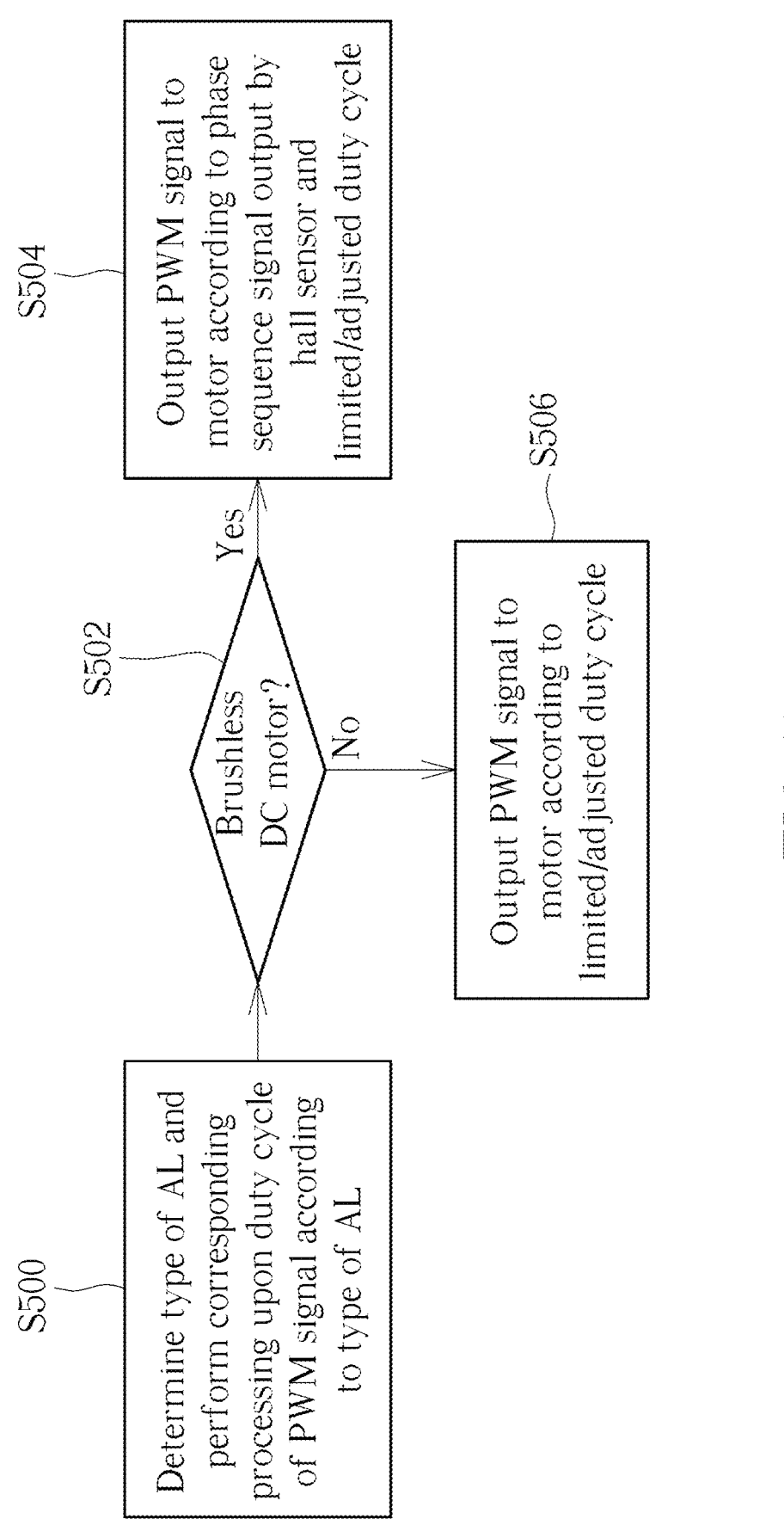
FIG. 5 is a diagram illustrating a servomotor control scheme of the processing circuit shown in FIG. 3 according to an embodiment of the present invention.

FIG. 5 is a diagram illustrating a servomotor control scheme of the processing circuit 310 shown in FIG. 3 according to an embodiment of the present invention, wherein the processing circuit 310 may execute the program code PROG' to implement the servomotor control scheme. Provided that the result is substantially the same, the steps are not required to be executed in the exact order shown in FIG. 5. It should be noted that, in some embodiments, if the alarm AL of the servomotor 10 occurs and the error log EL corresponding to the alarm AL has already been stored in the flash memory 304 (e.g., under the condition that the alarm AL is the same as a previous alarm stored in the flash memory 304), the servomotor control scheme shown in FIG. 5 may also be implemented by the microcontroller 302.

In Step S500, the processing circuit 310 may be further arranged to determine a type of the alarm AL and perform a corresponding processing upon a duty cycle of a PWM signal according to the type of the alarm AL, wherein the PWM signal is output to the servomotor 10 by the control circuit 306. For example, if the alarm AL is one of the blocking alarm, the over-current alarm, and the over-temperature alarm, the processing circuit 310 may limit/adjust the duty cycle of the PWM signal according to a current condition. For another example, if the alarm AL is the low-voltage alarm, the processing circuit 310 may limit outputting of the PWM signal. For another example, if the alarm is the over-voltage alarm, the processing circuit 310 may maintain the duty cycle of the PWM signal. This is for illustration only, and the present invention is not limited thereto. Since the corresponding processing for different types of the alarm AL is well known to those skilled in the art, and the focus of the present invention is on offload of the control operations regarding the servomotor 10 from the microcontroller 302 to the processing circuit 310, further descriptions for the corresponding processing are not described in detail here.

In Step S502, the processing circuit 310 may be further arranged to determine whether the servomotor 10 (more particularly, the motor 100 of the servomotor 10) is a brushless DC motor. If Yes, Step S504 is entered; if No, Step S506 is entered.

In Step S504, the processing circuit 310 may execute the motor algorithm to control the control circuit 206 to output the PWM signal to the motor 100 according to the phase sequence signal output by the hall sensor and the limited/adjusted duty cycle.

In Step S506, the processing circuit 310 may execute the motor algorithm to control the control circuit 206 to output the PWM signal to the motor 100 according to the limited/adjusted duty cycle. After Step S504/S506 is executed, the rotation direction of the servomotor 10 before the alarm AL of the servomotor 10 occurs can be maintained, to ensure the servomotor 10 to operate normally while the microcontroller 302 stores the error log EL in the flash memory 304.

Since a person skilled in the pertinent art can readily understand details of the steps shown in FIG. 5 after reading the above paragraphs, further description is omitted here for brevity.

Figure 6:
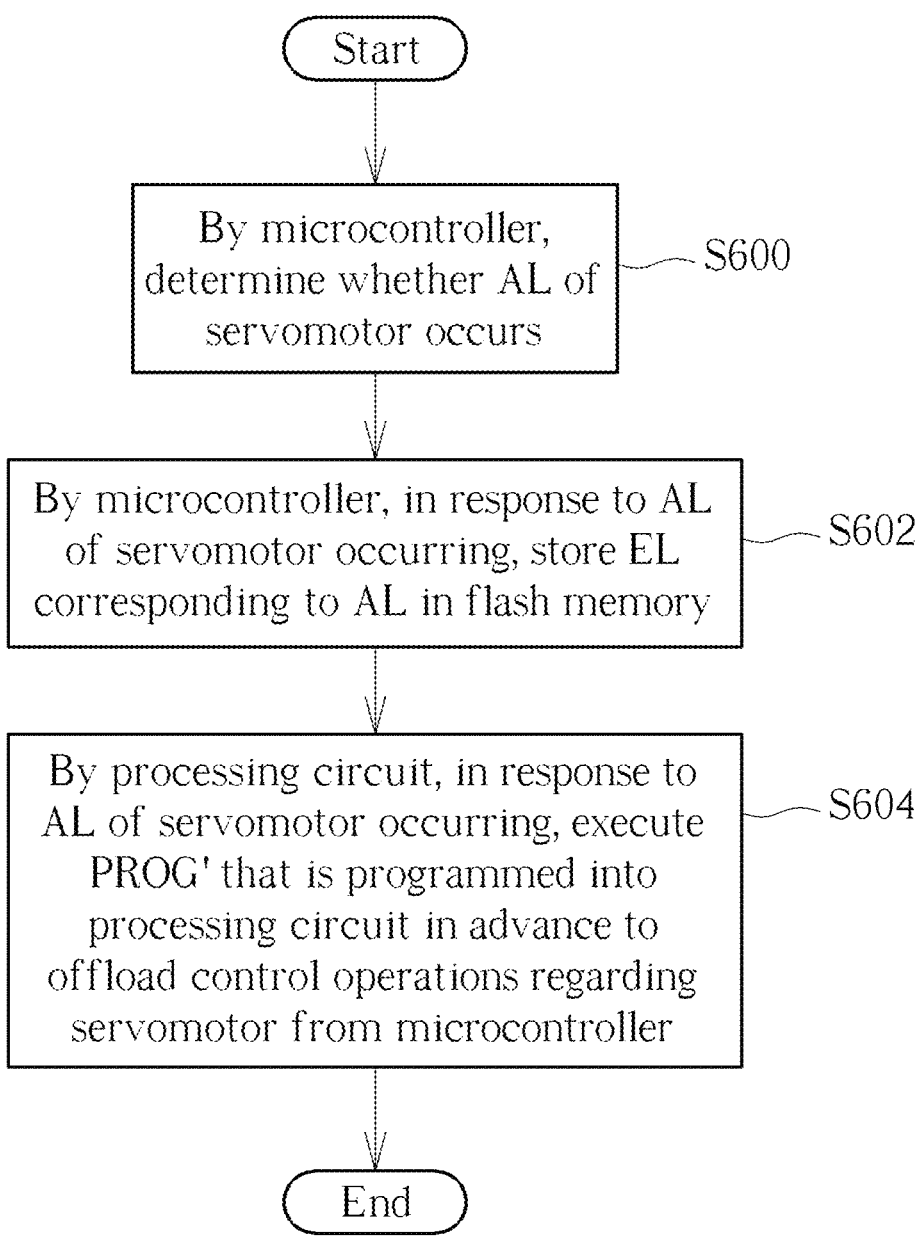
FIG. 6 is a flow chart of a control method for a servomotor according to an embodiment of the present invention.

FIG. 6 is a flow chart of a control method for the servomotor 10 according to an embodiment of the present invention. Provided that the result is substantially the same, the steps are not required to be executed in the exact order shown in FIG. 6. For example, the switching operation shown in FIG. 6 may be employed by controller 300 shown in FIG. 3 (more particularly, the microcontroller 302 and processing circuit 310).

In Step S600, by the microcontroller 302, it is determined whether the alarm AL of the servomotor 10 occurs.

In Step S602, by the microcontroller 302, in response to the alarm AL of the servomotor 10 occurring, the error log EL corresponding to the alarm AL is stored in the flash memory 304.

In Step S604, by the processing circuit 310, in response to the alarm AL of the servomotor 10 occurring, the program code PROG' that is programmed into the processing circuit 310 in advance is executed to offload the control operations regarding the servomotor 10 from the microcontroller 302.

Since a person skilled in the pertinent art can readily understand details of the steps shown in FIG. 6 after reading the above paragraphs, further description is omitted here for brevity.

In summary, by the controller applied to a servomotor and the associated control method proposed by the present invention, in response to an alarm of the servomotor occurring, an error log corresponding to the alarm can be stored in a flash memory and operations of the servomotor can be maintained at the same time, which can avoid certain fatal errors of a device to which the servomotor is applied. In addition, compared with a case where an electrically-erasable programmable read-only memory (EEPROM) is coupled to the servomotor controller through a bus for storing the error log, the controller of the present invention can effectively decrease the overall manufacturing cost and decrease the size of the PCB by utilizing the processing circuit.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A controller applied to a servomotor, comprising:
   a flash memory, arranged to store a first program code for controlling the servomotor;
   a microcontroller, arranged to determine whether an alarm of the servomotor occurs, wherein in response to the alarm of the servomotor occurring, the microcontroller is arranged to store an error log corresponding to the alarm in the flash memory; and
   a processing circuit, wherein a second program code is programmed into the processing circuit in advance, and the second program code is a copied version of the first program code; and in response to the alarm of the servomotor occurring, the processing circuit is arranged to execute the second program code.

2. The controller of claim 1, wherein in response to the alarm of the servomotor occurring, the first program code is prevented from being read from the flash memory by the microcontroller.

3. The controller of claim 1, wherein in response to the alarm of the servomotor not occurring, the microcontroller is arranged to read and execute the first program code from the flash memory.

4. The controller of claim 1, wherein the microcontroller is further arranged to determine whether the alarm is a previous alarm in the flash memory.

5. The controller of claim 4, wherein in response to the alarm being the previous alarm in the flash memory, the microcontroller is arranged to read and execute the first program code from the flash memory; and in response to the alarm not being the previous alarm in the flash memory, the microcontroller starts to store the error log corresponding to the alarm in the flash memory, and the processing circuit starts to execute the second program code.

6. The controller of claim 1, wherein the microcontroller is further arranged to determine whether storage of the error log is completed.

7. The controller of claim 6, wherein in response to the storage of the error log being completed, the processing circuit stops executing the second program code.

8. The controller of claim 1, wherein the processing circuit is further arranged to determine a type of the alarm and perform a corresponding processing upon a duty cycle of a pulse width modulation (PWM) signal according to the type of the alarm, and the PWM signal is output to the servomotor.

9. The controller of claim 8, wherein the processing circuit is further arranged to determine whether the servomotor is a brushless direct current (DC) motor.

10. The controller of claim 9, wherein in response to the servomotor being the brushless DC motor, the PWM signal is output according to a phase sequence signal output by a hall sensor and the duty cycle; and in response to the servomotor not being the brushless DC motor, the PWM signal is output according to the duty cycle.

11. A control method for a servomotor, comprising:
determining, by a microcontroller, whether an alarm of the servomotor occurs;
in response to the alarm of the servomotor occurring, storing, by the microcontroller, an error log corresponding to the alarm in a flash memory, wherein the flash memory is further arranged to store a first program code for controlling the servomotor; and
in response to the alarm of the servomotor occurring, executing, by a processing circuit, a second program code, wherein the second program code is programmed into the processing circuit in advance, and the second program code is a copied version of the first program code.

12. The control method of claim 11, further comprising:
in response to the alarm of the servomotor occurring, preventing the first program code from being read from the flash memory by the microcontroller.

13. The control method of claim 11, further comprising:
in response to the alarm of the servomotor not occurring, reading and execute, by the microcontroller, the first program code from the flash memory.

14. The control method of claim 11, further comprising:
determining, by the microcontroller, whether the alarm is a previous alarm in the flash memory.

15. The control method of claim 14, wherein the step of determining, by the microcontroller, whether the alarm is the previous alarm in the flash memory comprises:
in response to the alarm being the previous alarm in the flash memory, reading and executing, by the microcontroller, the first program code from the flash memory; and
in response to the alarm not being the previous alarm in the flash memory, starting, by the microcontroller, to store the error log corresponding to the alarm in the flash memory, and starting, by the processing circuit, to execute the second program code.

16. The control method of claim 11, further comprising:
determining, by the microcontroller, whether storage of the error log is completed.

17. The control method of claim 16, wherein the step of determining, by the microcontroller, whether the storage of the error log is completed comprises:
in response to the storage of the error log being completed, stopping, by the processing circuit, executing the second program code.

18. The control method of claim 11, further comprising:
determining, by the processing circuit, a type of the alarm; and
performing, by the processing circuit, a corresponding processing upon a duty cycle of a pulse width modulation (PWM) signal according to the type of the alarm, wherein the PWM signal is output to the servomotor.

19. The control method of claim 18, further comprising:
determining, by the processing circuit, whether the servomotor is a brushless direct current (DC) motor.

20. The control method of claim 19, wherein the step of determining, by the processing circuit, whether the servomotor is the brushless DC motor comprises:
in response to the servomotor being the brushless DC motor, outputting the PWM signal according to a phase sequence signal output by a hall sensor and the duty cycle; and
in response to the servomotor not being the brushless DC motor, outputting the PWM signal according to the duty cycle.

* * * * *